United States Patent [19]

Green

[11] 4,395,194

[45] Jul. 26, 1983

[54] METHOD OF HANDLING HARVESTED MATERIAL

[75] Inventor: John C. Green, Ely, England

[73] Assignee: Hassy Horticultural Development Ltd., Cambridgeshire, England

[21] Appl. No.: 242,993

[22] Filed: Mar. 12, 1981

Related U.S. Application Data

[62] Division of Ser. No. 111,096, Oct. 1, 1980, abandoned.

[30] Foreign Application Priority Data

Mar. 5, 1979 [GB] United Kingdom ................ 7907585

[51] Int. Cl.³ ...................... B65G 67/08; B65G 67/22
[52] U.S. Cl. ................................................. 414/786
[58] Field of Search .................. 414/57, 91, 110, 177, 414/269, 270, 272, 300, 334, 335, 340, 345, 786

[56] References Cited

U.S. PATENT DOCUMENTS

| 2,584,361 | 2/1952 | Morine | 198/588 X |
| 3,149,734 | 9/1964 | Ilmoni | 414/177 |
| 3,759,126 | 9/1973 | Burgess | 198/424 X |

Primary Examiner—Robert G. Sheridan
Attorney, Agent, or Firm—Lee, Smith & Jager

[57] ABSTRACT

A method of handling material which has been harvested comprising the steps of placing the material on a conveyor arranged at an oblique angle to a direction of motion of a trailer and a harvester moving at differential speeds and simultaneously reciprocating the conveyor along its length and driving the conveyor to advance the harvested material therealong from the harvester to the trailer.

5 Claims, 3 Drawing Figures

METHOD OF HANDLING HARVESTED MATERIAL

RELATED APPLICATION

This application is a division of my application Ser. No. 111,096 filed Oct. 1, 1980, now abandoned.

FIELD OF INVENTION

The invention relates to a method of handling harvested material, and is of particular but not exclusive application to the harvesting of crops such as celery which have a definite orientation.

BACKGROUND TO THE INVENTION

When harvesting, for example, celery it is desirable to present the crop for packaging or treatment with the plants aligned in a common manner, suitably butt first. Harvesting machines presently available are capable only of delivering the plants into a trailer in random orientations.

PRIOR ART

British Patent Specification No. 771,409 describes the use of conveyors for discharging material in successive uniform layers. This is achieved by moving a first conveyor backwards and forwards across the area on which material is to be spread and simultaneously moving the conveyor laterally so that each forward and backward movement of the conveyor distributes material over an adjoining section of the area, a second conveyor being arranged at right angles to the first conveyor and movable with the first conveyor in the direction perpendicular to the backward and forward motion of the first conveyor so that relative motion of the first conveyor can be accommodated and articles delivered from a main conveyor will always be deposited on to the final delivery conveyor ready for discharge over the area.

The arrangement described in No. 771409 is not readily adaptable for use on the land and in conjunction with a harvester such as a celery harvester. The large number of separate conveyors each of which has to be carefully orientated with the others is acceptable in a static situation such as described in the reference but in practice would break down under conditions in the field.

A root crop harvester is described in British Patent Specification No. 1,405,371. A harvester includes a laterally extending conveyor which is capable of being moved from the position shown in FIG. 2 to the position shown in FIG. 3 of the drawings so as to allow the unit to operate in two different modes. In the stowed condition the unit is more easily transported on a highway which would otherwise be difficult because of the undue width of the vehicle when the conveyor is extended. The movement into the stowed condition is only described with reference to the storage of the conveyor inboard of the harvester to facilitate driving the harvester along the highway. There is no provision for controlled in and out movement of the conveyor boom nor is there any teaching to explain how this in and out movement of a conveyor can be used to lay down material in a trailer or the like in uniform layers.

Another harvester for root crops is described in West German Patent Specification No. 2818721. In this disclosure a lateral final conveyor dumps turnips into a trailer towed in parallel with a harvester. The lateral conveyor extends normal to the direction of motion of the vehicles, and although very rough distribution through the length of the trailer could be carried out by advancing the trailer at a different speed to that of the harvester, for example as disclosed for a tobacco harvester in U.S. Pat. No. 4,059,941, this would not result in tidy layering of the material into the trailer with uniform orientation of the crop.

OBJECT OF THE INVENTION

It is a primary object of the invention to provide a method which permits harvested material to be lifted into a trailer in an orderly manner and with a defined orientation.

THE INVENTION

The invention accordingly provides, in one aspect, a method of handling material harvested by a first vehicle and transferring it to a second vehicle moving alongside the first vehicle comprising the steps of loading the material on a conveyor arranged on the first vehicle with its conveying direction at an oblique angle to a direction of motion of the vehicles, advancing the two vehicles at differential speeds and simultaneously both reciprocating the conveyor along its conveying direction and driving the conveyor to advance the harvested material to the second vehicle.

Preferably the conveyor is driven only during one sense of movement of the reciprocating cycle.

In this way, the conveyor will lay down a row of plants during one half of each shuttle cycle. Where the plants are laid in a trailer pulled by another vehicle, owing to the angle of the conveyor to the direction of motion a series of ordered rows of plants may be laid in the trailer by towing the trailer at a speed slightly greater than that of the vehicle on which the apparatus is mounted.

In a preferred method the conveyor is mounted on a harvester and the method involves the steps of driving the harvester through a crop and discharging on to the conveyor the harvested material, and causing the conveyor to discharge the harvested material onto a trailer towed alongside the harvester, the method further comprising the steps of driving the harvester at constant speed and driving the trailer at a slightly greater speed so that the plant material is deposited on the trailer in a series of orderly rows to form a layer and the method further comprises the step of arresting the forward movement of the trailer to allow the conveyor to return to the front of the trailer with continued constant forward movement of the harvester and the further step of restarting the trailer at its original speed when the conveyor reaches the front of the trailer so as to form a further layer within the trailer. In such preferred method the trailer has a raisable and lowerable floor and the method involves the step of raising the floor to the top of the trailer to receive the first layer of harvested material and lowering the floor in steps to receive subsequent and further layers. There may then follow the final step of delivering harvested material from the trailer through an openable panel at the bottom of the rear wall thereof by a conveying means constituted by said raisable and lowerable floor.

BRIEF SUMMARY OF DRAWINGS

An embodiment of the present invention will now be described by way of example with reference to the accompanying drawing, in which.

DESCRIPTION OF EMBODIMENT

Figure 1:
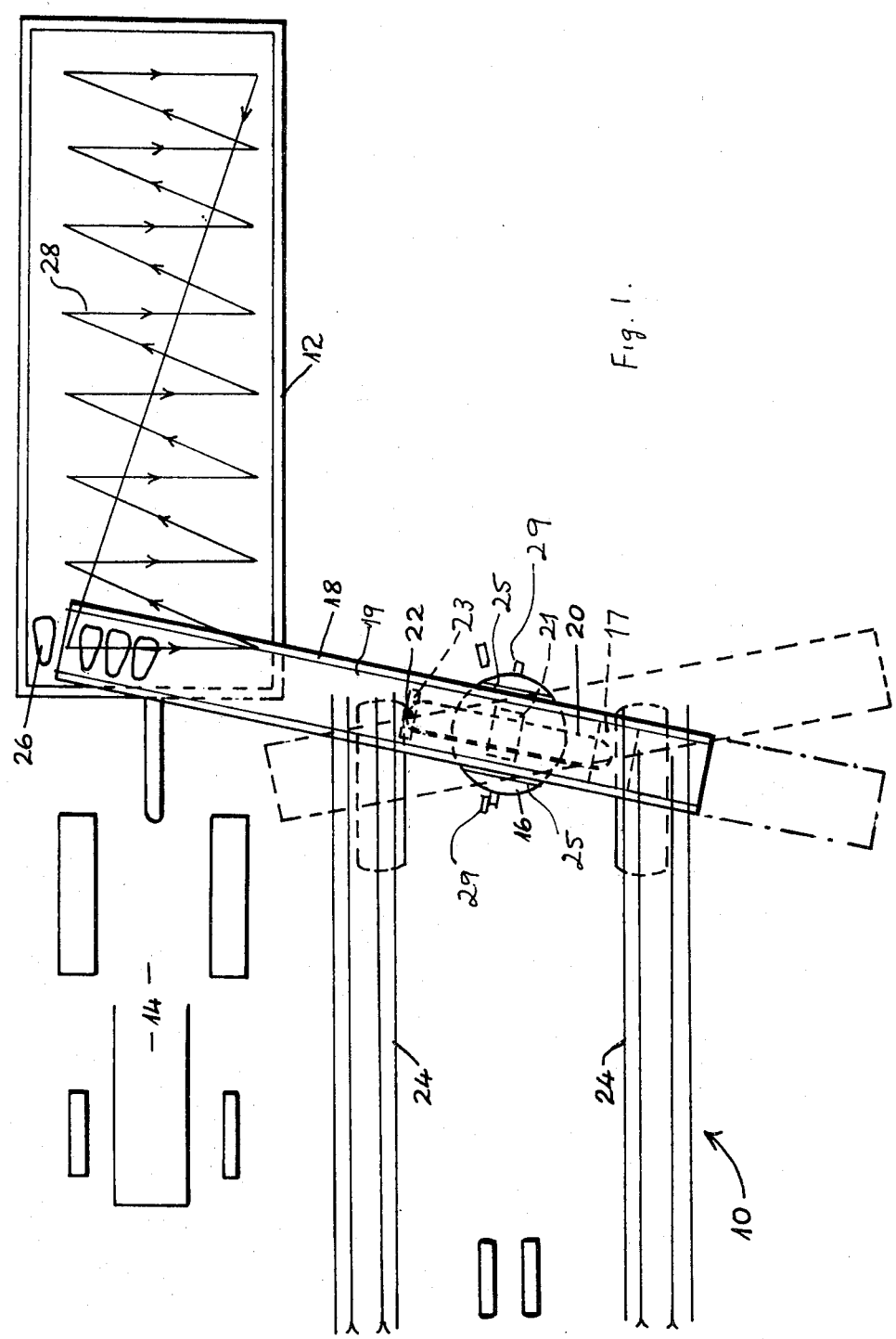
FIG. 1 is a schematic plan view of an apparatus for effecting the method of the invention.

This preferred embodiment is concerned with the harvesting of celery. A harvester indicated at 10 uses the apparatus to be described to discharge celery into a trailer 12 towed behind a tractor indicated at 14. The harvester 10 is of known type and will therefore not be shown or described in detail.

The apparatus for effecting the method of the invention includes a base 16 secured to the harvester 10. A conveyor supporting frame 18 is mounted on the base 16 to carry a conveyor 19 discharging to the side. The conveyor 19 is positioned at about 11° to the sideways dimension of the harvester, i.e. the conveyor 19 makes an angle of about 79° to the direction of motion of the harvester 10. The conveyor 19 is suitably a conventional belt conveyor driven by a hydraulic or electric motor 17 carried by the supporting frame 18. The conveyor frame 18 is arranged to be reciprocated along its length, relative to the base 16, by shuttle means which comprises a driven belt or chain 20 supported on the base 16 and driven by a motor 21 mounted on said base, said belt or chain 20 carrying a pin 22 engaging the conveyor frame 18 at a transverse slot 23 therein. The conveyor frame 18 carrying the driven conveyor 19 thus moves with respect to the harvester 10 between an outboard position shown in full lines and an inboard position shown chain-dotted. Guides on the base 16 for guiding the longitudinal reciprocation of the harvester frame 18 are indicated at 25.

Harvested celery is placed side by side on the conveyor 19 with the butt towards the direction of motion. This may be done by hand, or the celery may be fed to the conveyor 19 by longitudinal conveyor belts 24 on the harvester 10 which suspend the celery stick bunches to orientate them vertically and then lead them in known manner through suitable guides (not shown) to orientate them in required side by side relationship on the conveyor 19. The celery is indicated schematically at 26.

The conveyor 19 is driven only when the conveyor frame 18 is moving inboard with respect to the harvester, and is maintained stationary while the conveyor frame moves outboard. This is effected by a conveyor drive interrupting means coupled with the shuttle motion, as hereinafter described with reference to FIG. 2.

The harvester 10 is driven forward at a speed suitably of 200 ft/min (61 m/min), and the trailer 12 is advanced at a speed 37.5 ft/min (11.4 m/min) greater.

Thus, starting from the position shown in the drawing, the conveyor 19 advances the celery 26 towards the trailer 12 while simultaneously moving bodily with its supporting frame 18 inwards of the harvester. Owing to the angle of the conveyor and the greater relative speed of the trailer, the end of the conveyor 19 describes a straight line across the width of the trailer 12 and thus deposits the celery in such a line butt forward. During the outward stroke of the conveyor assembly no celery is delivered, and the end of the conveyor assembly moves to a position at the outboard side of the trailer 12, ready to start a new row. The path of the end of the conveyor 19 relative to the trailer 12 is shown by the line 28.

This process is repeated until a row of celery is deposited across the rear of the trailer 12. At this point the tractor 14 is stopped briefly to permit the end of the conveyor 19 to return to the position shown in the drawing, i.e. at the front of the trailer 12. If this return movement occupies more than one half shuttle cycle of the conveyor, some celery will be scattered across the layer already formed, but it has been found that this is generally acceptable. If not, an override control available to the harvester operator may stop the shuttle drive motor 21 and/or the conveyor motor 17 while the trailer is slowed down or stopped. The process is then repeated to form another layer, and so on until the trailer 12 is full.

The base 16 can be slewed for the conveyor 19 to have an equal angle in the opposite direction as indicated in dotted lines, for working to the opposite side. Stops limiting the slewing movement of the base 16 to define the correct angular positions thereof are indicated at 29.

It has been found that it is possible for the tractor driver easily to judge his speed relative to the harvester sufficiently well to maintain the relationship described above. Assistance is conveniently given by revolution counters of conventional kind provided in the cab of the harvester or of the tractor or preferably both, whereby both operators can use the conventionally provided throttle controls to maintain the revolution counters at appropriate predetermined indications corresponding to the differential speeds required for the two vehicles.

Figure 2:
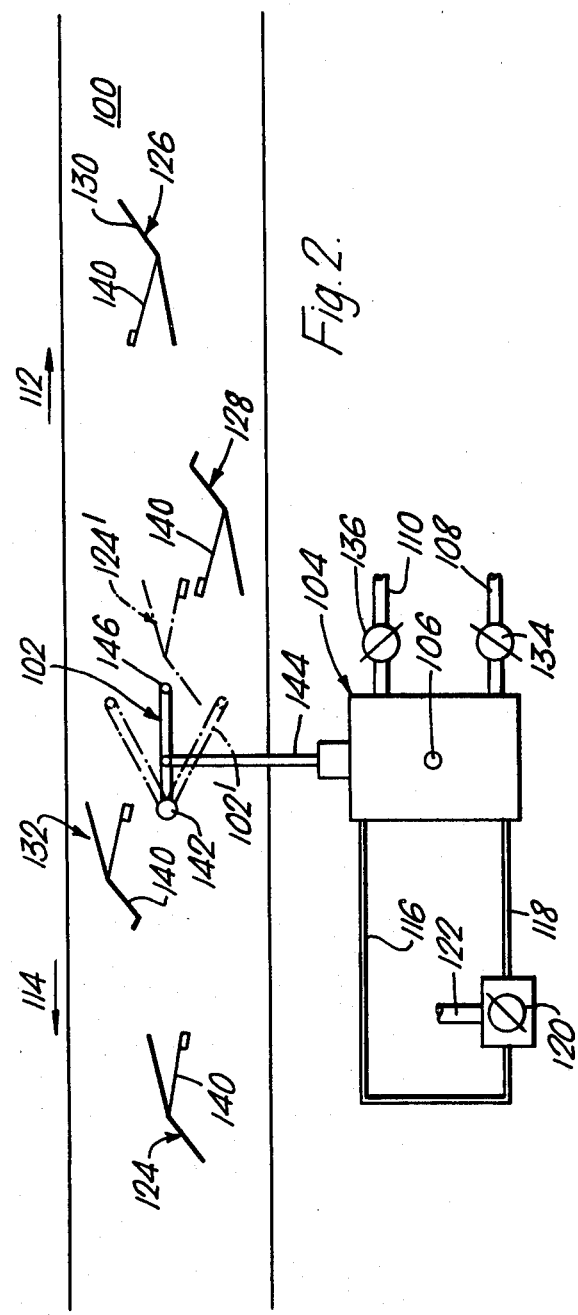
FIG. 2 is a diagrammatic view of drive interrupting means incorporated in the apparatus of FIG. 1.

Referring now to FIG. 2, the means is shown for correlating the shuttle motion with the conveyor drive. The conveyor frame 18 of FIG. 1 includes a longitudinal channel section member on each side, one of which is shown at 100 in FIG. 2. On the channel section member 100 are mounted various cam devices for operating a lever switch which is shown at 102 and which is mounted on the corresponding conveyor frame guide 25 of FIG. 1 and in the mid-position controls a hydraulic valve 104 into an off state. In the off state no hydraulic fluid from a main supply 106 is supplied to either of outlet pipes 108 or 110. Fluid supplied to one or the other pipe 108 or 110 will produce movement of the conveyor 19 and it is arranged that fluid supplied along 108 will cause the conveyor belt 19 to move in the direction of the arrow 112 whilst supplying fluid to outlet 110 will move the conveyor belt 19 in the opposite direction shown by arrow 114.

The valve 104 includes a piston which can be either mechanically moved up and down by the lever arm 102 or can be hydraulically moved up or down by fluid supplied along lines 116 and 118 from a control valve 120 located in the operating cab and having high pressure fluid supplied along line 122. In this way the operator can actually stop or initiate movement of the conveyor belt 19 and override the controls as determined by the cam devices now to be described.

The arrangement is such that the amplitude of the reciprocation of the conveyor frame 18 will just move cam device 124 in the direction of arrow 112 up to the position shown in dotted outline at 124', whilst the movement of the conveyor frame in the opposite direction (arrow 114) will just bring the cam device 126 into an analogous position on the other side of the lever switch 102. In the first of these two extreme positions cam 124 deflects the lever switch 102 downwardly to the position shown at 102' and this produces movement of the conveyor belt 19 in the direction of 112. Simultaneously the conveyor frame 18 is of course reversed due to the action of the belt 20, pin 22 and slot 23 previously described with reference to FIG. 1 and begins to move in the opposite direction, i.e. in the direction of arrow 114. Unloading of the conveyor belt 19 into the tractor 12 occurs in the manner already described until the lever switch 102 in its lowered position engages the cam 128 and is deflected in an upward direction so as to arrest the movement of the conveyor belt. Delivery from the end of the conveyor ceases whilst the conveyor 19 moves in the reverse direction (in the direction of arrow 112) until the switch lever 102 once again engages the cam 124.

The reverse applies in the case of cams 126 and 132, which are operable when the conveyor assembly on base 16 is slewed into its opposite inclination.

Since the conveyor frame 18 must go through its complete amplitude during each shuttling movement, the outputs 108 and 110 from the valve 104 are themselves gated by means of on/off valves 134 and 136. The appropriate valve is opened depending on whether the conveyor is delivering to the left or the right so that interaction between the cams 126 and 132 and the lever arm 102 does not produce reverse operation of the conveyor drive during the return cycle. Likewise with the on/off switches reversed, interaction between the cams 124 and 128 and the switch lever 102 produces no operation of the conveyor drive but interaction between the cams 126 and 132 on the part of the lever switch 102 does produce operation of the conveyor drive.

Each of the cams 124, 126, 128 and 132 includes a spring-loaded entrance guide each of which is designated by the reference numeral 140. Each guide 140 forces the lever switch 102 into contact with the cam surface and produces a positive clean on/off action.

The operation of the valve 104 is progressive, the inclination of the operating surfaces of the cams such as at 130 being selected so as to produce just the right cut-off characteristic for the hydraulic motor 17 driving the conveyor belt 19. In this way there is no tendency for a sudden jerk to occur as the belt comes to rest or begins to move again since the inclined cam surface produces a gradual closing or gradual opening of the valve 104 which because of the progressive characteristic of the valve is seen at the hydraulic motor as a requirement for gradual slowing down or gradual speeding up.

At this point it is convenient to refer to the analogous characteristic of the shuttling motion produced by the belt or chain 20 and pin/slot coupling 22, 23. The curvature around the two ends of the belt drive 20 causes a gradual deceleration, momentary stoppage and gradual acceleration of the conveyor frame 18 as the pin 22 passes around the curved portion of the path in driving engagement with the slot 23. As is the case with the conveyor drive, this is important to avoid a jerked stoppage or acceleration which could dislodge the celery or like harvested material on the conveyor 19.

Reverting to FIG. 2, lever switch 102 is pivoted at 142 to the conveyor frame guide 25 of FIG. 1 and is connected to the piston (not shown) in the control valve 104 by means of a rigid link 144.

At the end of the lever arm 102 is a transversely extending pin 146 which is the part of the lever arm which actually engages the cams such as 124 etc. It is only the lateral pin 146 which extends into the path of the cams 128 etc. The mounting for the lever switch 102 is kept to the side of the path of the cams 128 etc.

Figure 3:
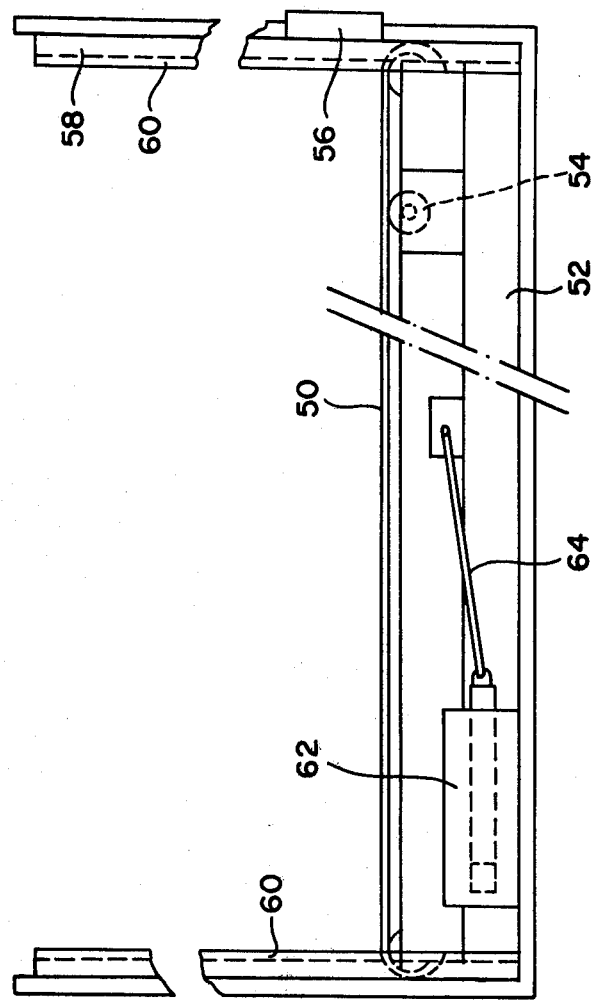
FIG. 3 is a diagrammatic elevational view of a trailer within a side wall thereof.

Turning now to FIG. 3, the trailer 12 itself incorporates a conveying means 50 mounted on a frame 52. The trailer 12 can be unloaded by actuating the conveyor 50 through hydraulic motor 54, thereby to deliver celery through an openable panel 56 at the bottom of the rear end wall 58 of the trailer. The conveying means 50 constitutes the floor of the trailer 12 on to which the celery is unloaded in layers from the conveyor 19. In order to avoid bruising of the celery or like harvested crop, and to assist in maintaining a desired orientation within the layers, it is preferable for the conveyor 19 not to unload the material so that is has a substantial drop on to the trailer floor. Accordingly, the conveyor frame 52 is raisable and lowerable within the trailer on vertical guides 60, thereby enabling the floor constituted by the conveyor 50 to be raised or lowered. A hydraulic drive for the conveyor frame is indicated at 62, coupled to the conveyor frame 52 by a linkage which for simplicity is shown in FIG. 3 as a single pivoted arm 64.

In use, the floor 50 is raised to near the top of the trailer 12 to receive the first layer of celery. The operator, from a remote control in the tractor cab, then progressively lowers the floor 50 to receive succeeding and further layers of material on top of the layer or layers already laid. Any substantial fall of the material from the conveyor 19 is thereby avoided.

Although described above with reference to celery, the invention is also applicable to other crops, both crops where orientation is significant such as bunching carrots, salad onions and leeks, and crops which are easily damaged such as potatoes, pickle cucumbers, tomatoes and white cabbage.

It will be understood that the invention is not limited to the particular embodiment hereinbefore described but the scope of the invention is defined solely by the following claims.

I claim:

1. A method of handling material harvested by a first vehicle and transferring it to a second vehicle moving alongside the first vehicle comprising the steps of loading the material on a conveyor arranged on the first vehicle with its conveying direction at an oblique angle to a direction of motion of the vehicles, advancing the two vehicles at differential speeds and simultaneously both reciprocating the conveyor along its conveying direction and driving the conveyor to advance the harvested material to the second vehicle.

2. A method of handling harvested material as set forth in claim 1 in which the conveyor is driven only during one sense of movement of the reciprocating cycle.

3. A method of handling harvested material as set forth in claim 2 wherein the conveyor is mounted on a harvester and the method involves the steps of driving the harvester through a crop and discharging on to the conveyor the harvested material, and causing the conveyor to discharge the harvested material onto a trailer towed alongside the harvester, the method further comprising the steps of driving the harvester at constant speed and driving the trailer at a slightly greater speed so that the plant material is deposited on the trailer in a series of orderly rows to form a layer and the method further comprises the step of arresting the forward movement of the trailer to allow the conveyor to return to the front of the trailer with continued constant forward movement of the harvester and the further step of restarting the trailer at its original speed when the conveyor reaches the front of the trailer so as to form a further layer within the trailer.

4. A method of handling harvested material as set forth in claim 3 in which the trailer has a raisable and lowerable floor and the method involves the step of raising the floor to the top of the trailer to receive the first layer of harvested material and lowering the floor in steps to receive subsequent and further layers.

5. A method of handling harvested material as set forth in claim 4, including the final step of delivering harvested material from the trailer through an openable panel at the bottom of the rear wall thereof by a conveying means constituted by said raisable and lowerable floor.

* * * * *